(12) United States Patent
Laturell et al.

(10) Patent No.: US 8,923,508 B2
(45) Date of Patent: Dec. 30, 2014

(54) HALF-DUPLEX SPEAKERPHONE ECHO CANCELER

(75) Inventors: Donald R. Laturell, Oak Hill, FL (US); Kannan Srinivasan, Macungie, PA (US); Chao-pin Chen, Martinsville, NJ (US)

(73) Assignee: LSI Corporation, San Jose, CA (US)

( * ) Notice: Subject to any disclaimer, the term of this patent is extended or adjusted under 35 U.S.C. 154(b) by 37 days.

(21) Appl. No.: 13/490,596

(22) Filed: Jun. 7, 2012

(65) Prior Publication Data

US 2013/0329882 A1    Dec. 12, 2013

(51) Int. Cl.
*H04M 9/08*    (2006.01)

(52) U.S. Cl.
USPC ............................... 379/406.08; 379/388.02

(58) Field of Classification Search
CPC ... H04M 1/6033; H04M 1/6008; H04M 9/08; H04M 1/585; H04M 19/08; H04M 9/082; H04M 9/085; H04M 1/04; H04M 9/10; H04M 1/03; H04M 1/6041; H04M 1/20; H04M 1/6016; H04M 1/72502; H04M 3/40; H04B 3/23; H04B 3/20; H04B 3/234; H04B 3/238; H04B 3/231; H04B 3/237; H04B 7/00
USPC .................. 379/387.01–395, 406.01–406.16, 379/420.01–420.04, 433.02; 381/59, 381/71.1–71.14, 89, 96, 332; 370/284, 370/286–296
See application file for complete search history.

(56) References Cited

U.S. PATENT DOCUMENTS

| | | | |
|---|---|---|---|
| 4,065,646 A * | 12/1977 | Schuh | 379/344 |
| 4,912,758 A | 3/1990 | Arbel | |
| 4,965,822 A | 10/1990 | Williams | |
| 5,410,595 A | 4/1995 | Park et al. | |
| 5,612,996 A * | 3/1997 | Li | 379/406.06 |
| 5,646,990 A * | 7/1997 | Li | 379/406.08 |
| 5,657,384 A * | 8/1997 | Staudacher et al. | 379/406.08 |
| 5,680,450 A * | 10/1997 | Dent et al. | 379/406.08 |
| 5,764,753 A * | 6/1998 | McCaslin et al. | 379/406.07 |
| 6,009,165 A | 12/1999 | Karnowski | |
| 6,282,176 B1 * | 8/2001 | Hemkumar | 370/276 |
| 6,434,110 B1 | 8/2002 | Hemkumar | |
| 6,453,041 B1 | 9/2002 | Eryilmaz | |
| 6,744,884 B1 * | 6/2004 | Bjarnason | 379/406.01 |
| 2006/0250998 A1 * | 11/2006 | Beaucoup et al. | 370/286 |
| 2007/0041575 A1 * | 2/2007 | Alves et al. | 379/406.08 |

FOREIGN PATENT DOCUMENTS

EP    0364383    11/1994

\* cited by examiner

*Primary Examiner* — Akelaw Teshale

(57) ABSTRACT

A speakerphone having transmit path with a microphone and a first amplifier having a gain determined by a controller and an input coupled to the microphone, a receive path with a second amplifier having a gain determined by the controller and a speaker coupled to an output of the second amplifier, and operable in a half-duplex mode using an adaptive echo canceller to at least partially remove from the transmit path acoustically-coupled signals from the receive path. The controller increases the gain of the first amplifier and decreases the gain of the second amplifier when a level of signals in the transmit path exceed a level of signals in the receive path, and decreases the gain of the first amplifier and increases the gain of the second amplifier when the level of signals in the receive path exceed the level of signals in the transmit path.

12 Claims, 3 Drawing Sheets

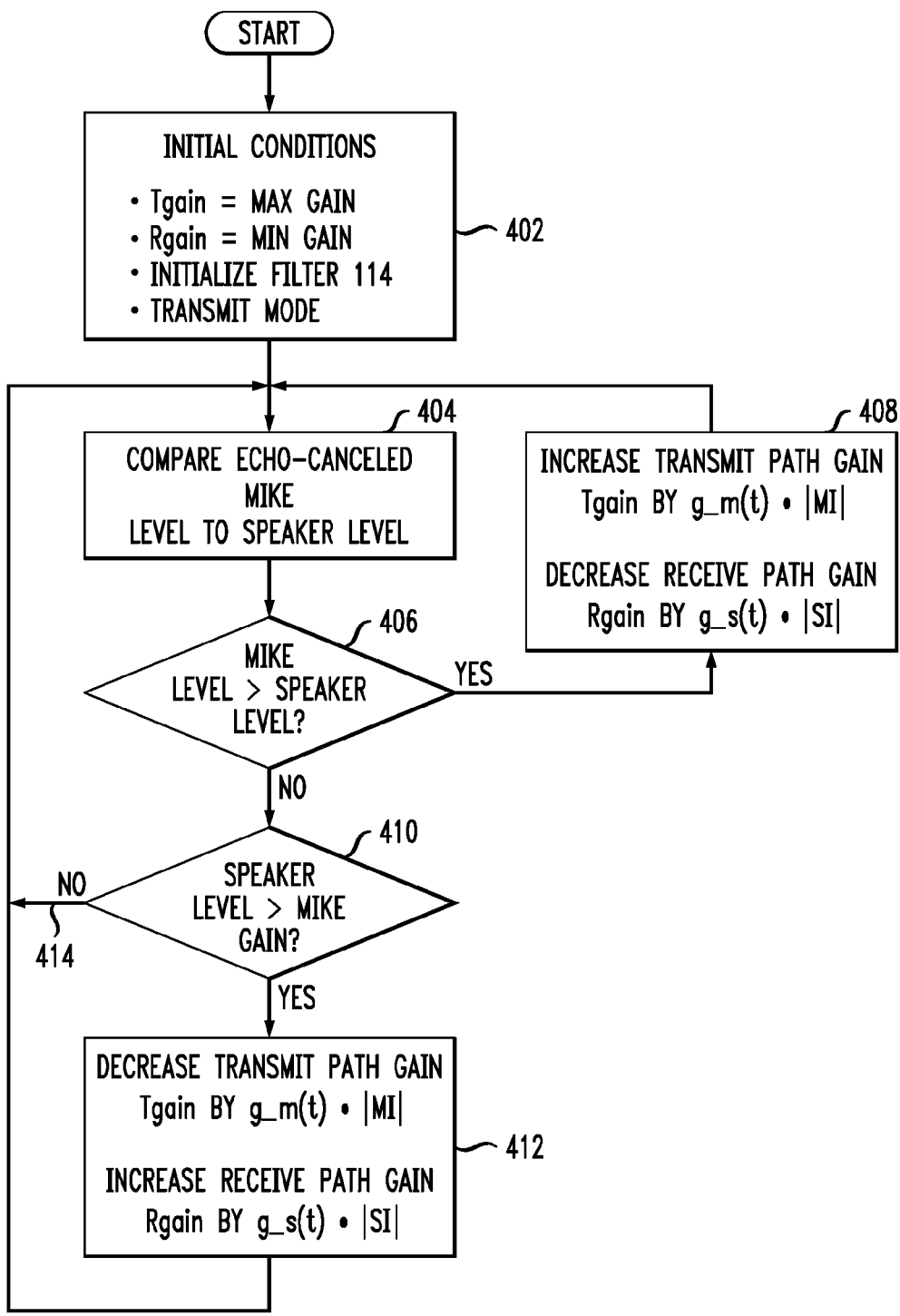

HALF-DUPLEX SPEAKERPHONE ECHO CANCELER

BACKGROUND

Speakerphone devices, also known as hands-free telephones, are in widespread use. A conventional speakerphone contains one or more microphones and one or more speakers. The microphone converts local sound waves into electrical signals for transmission by a telephone network. The speaker converts electrical signals received from the telephone network into sound waves. There are two basic types of speakerphones: full-duplex and half-duplex. A full-duplex speakerphone user perceives the speakerphone as providing simultaneous transmission and reception, i.e., the microphone and speaker are operating simultaneously, whereas a half-duplex speakerphone user perceives the speakerphone switching between transmit and receive modes (or dramatically change the gain of the microphone and speaker paths) depending on whether the far-end party or the speakerphone user is talking the loudest. The full-duplex speakerphone relies on a hybrid (a well-known circuit that converts bidirectional two-wire communications channel (e.g., the telephone network) into a four-wire communications channel (i.e., two unidirectional communication paths) in conjunction with adaptive echo canceller or the like to suppress any acoustic feedback between the speaker and microphone that can manifest itself as "acoustic howling". A half-duplex speakerphone is generally much simpler than a full-duplex speakerphone and relies on circuitry (including a hybrid) to determine the mode of operation depending on the level or volume of the signal received from the telephone line compared to the level of the signal from the microphone to be sent to the telephone line for transmission.

Full duplex speakerphones have the advantage of operating like a conventional telephone set: the user can speak to the other party at the same time speech or other sounds from the far-end party are being received. Half-duplex speakerphones allow communication one direction at a time and whoever talks the loudest determines the direction of communication. In some applications, high microphone gain is required to assure that the far-end party can hear sounds in the vicinity of the speakerphone, such as during an emergency condition when the speakerphone user might not be able to speak loud enough or is immobilized and is unable to get close enough for normal speakerphone operation. If sufficient ambient noise is present, the high microphone gain may sufficiently overwhelm the control circuitry in a half-duplex speakerphone that the far-end party is unable to talk loud enough to force the speakerphone into the receive mode so that the far-end party can query the speakerphone user about the nature of the emergency, her injury, needs, etc. In full-duplex speakerphones, the adaptive filtering might not be sufficient to overcome the highly amplified ambient noise, preventing the far-end party's voice from emanating from the speakerphone.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter.

In one embodiment of the invention, a method of operating a speakerphone having a variable gain transmit path and a variable gain receive path, comprises the steps of producing echo-canceled transmit signals using an adaptive echo canceller, and adjusting the gain of the transmit path inversely to the gain of the receive path in response to a level of the echo-canceled transmit signals compared to a level of received signals in the receive path.

In another embodiment of the invention, a speakerphone comprises a transmit path, a receive path, an echo canceller, and a controller. The transmit path and the receive path have variable gain and the echo canceller is coupled to the transmit path for at least partially removing from the transmit path acoustically-coupled signals from the receive path. The controller, responsive to signals in the transmit and receive paths, increases the gain of the transmit path and decreases the gain of the receive path when a level of the signals in the transmit path exceed a level of the signals in the receive path, and decreases the gain of the transmit path and increases the gain of the receive path when the level of the signals in the receive path exceed the level of the signals in the transmit path.

BRIEF DESCRIPTION OF THE DRAWINGS

Aspects and features of embodiments of the invention will become more fully apparent from the following detailed description, the appended claims, and the accompanying drawings in which like reference numerals identify similar or identical elements.

FIG. 4 is a simplified flow chart of operation of the speakerphone of FIG. 1.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

Also for purposes of this description, the terms "couple", "coupling", "coupled", "connect", "connecting", or "connected" refer to any manner known in the art or later developed in which energy is allowed to be transferred between two or more elements, and the interposition of one or more additional elements is contemplated, although not required. Conversely, the terms "directly coupled", "directly connected", etc., imply the absence of such additional elements. Signals and corresponding nodes or ports might be referred to by the same name and are interchangeable for purposes here. The term "or" should be interpreted as inclusive unless stated otherwise.

The present invention will be described herein in the context of illustrative embodiments of a speakerphone adapted to be for use with a public switched telephone network (PSTN), sometimes referred to as plain-old telephone service (POTS), or the digital equivalent thereof (e.g., integrated services digital network or ISDN). It is to be appreciated, however, that the invention is not limited to the specific apparatus and methods illustratively shown and described herein. Rather, aspects of the invention are directed broadly to techniques for beneficially integrating features of full-duplex operation with half-duplex (switch-loss) speakerphone operation.

Figure 1:
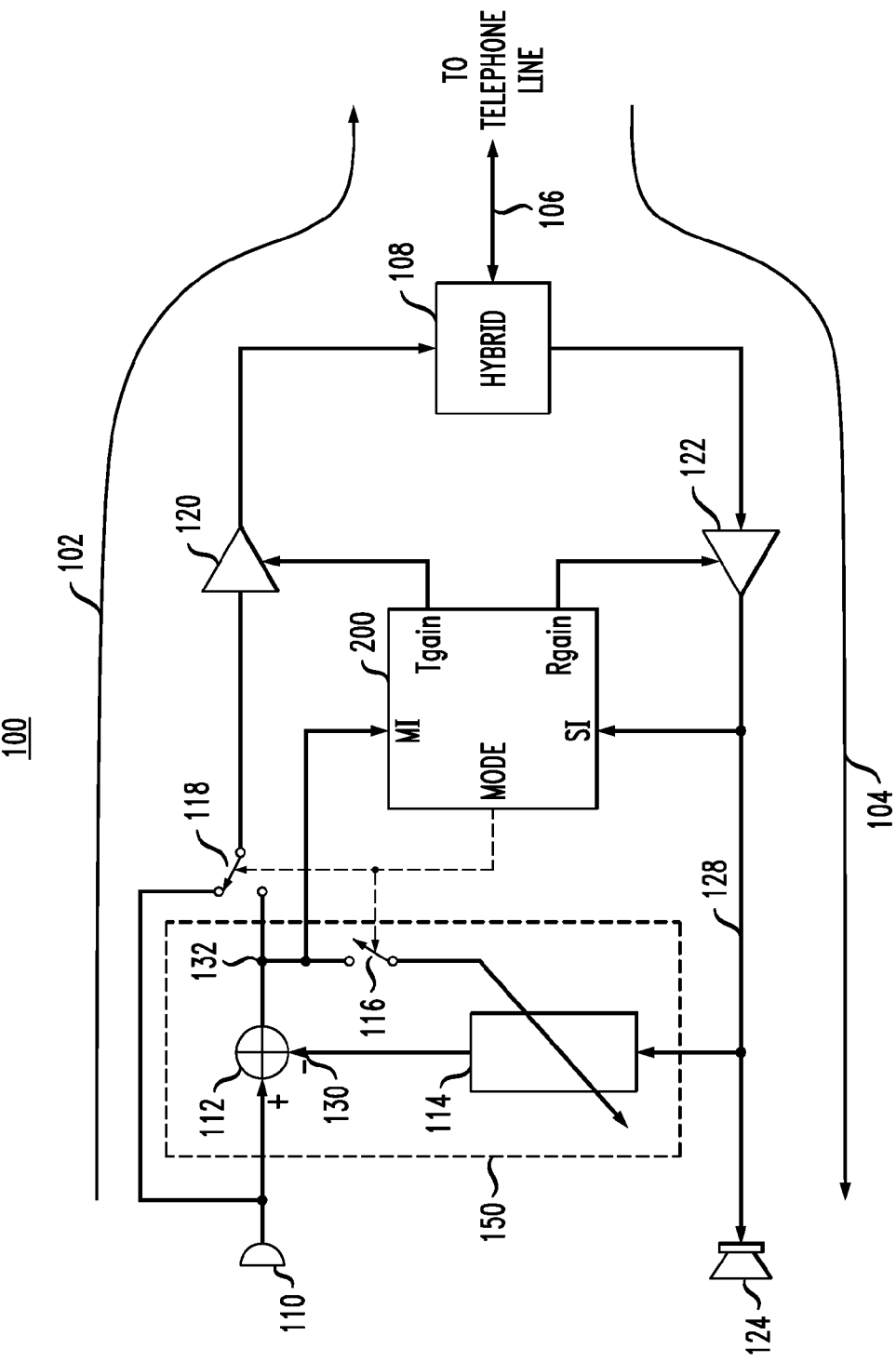
FIG. 1 is a simplified block diagram of speakerphone according to one embodiment of the invention.

A simplified block diagram of a speakerphone 100 in accordance with one embodiment of the invention is shown in FIG. 1. A transmit path 102 and a receive path 104 are coupled to a telephone line 106 by a conventional hybrid 108. One example of the hybrid is disclosed in U.S. Pat. No. 5,528,685 incorporated herein by reference in its entirety. It is understood that with certain digital communication networks, such as ISDN and voice-over-IP, no hybrid is required if digital four-wire functionality or the equivalent is provided by the network.

The transmit path 102 comprises a microphone 110, an adaptive echo canceller 150, and a controllable gain amplifier 120. The adaptive echo canceller 150 comprises a summer 112, an adaptive filter 114, and a control switch 116, a bypass switch 118. The receive path 104 comprises a controllable gain amplifier 122 driving a speaker 124. The adaptive filter 114 filters a signal on node 128 that was received from the telephone line 106 and amplified by amplifier 122, the filtered signal applied to the inverting input 130 of the summer 112. As will be described in more detail below and assuming that the filter coefficients of the filter 114 has converged (i.e., the adaptive filter 114 has been "trained" to mimic the speakerphone's acoustic environment), the output of the summer 112 on node 132 represents the audio in the speakerphone's environment (speakerphone user's voice, ambient noise, etc.) picked up by the microphone 110 with the audio from the speaker 124 (and echoes thereof) at least partially removed. The signal on node 132 is referred to herein as the echo-canceled microphone signal.

As will be explained in more detail in connection with FIGS. 2 and 3, a controller 200 adjusts the gain of the amplifiers 120, 122 in response to the level or energy of the signals on nodes 128 and 132. In addition, the controller 200 configures the switches 116 and 118. In one embodiment and as will be explained in more detail below, the controller 200 "closes" switch 116 and "configures" switch 118 to couple node 132 to amplifier 120 to train the adaptive filter 114 when the speakerphone 100 is first enabled or turned-on. Once the filter 114 is trained, indicated by the coefficient values of the filter 114 having converged to stable values or a time period elapses, the controller 200 "opens" switch 116 to suspend adaptation by filter 114 and "reconfigures" switch 118 to couple the input of amplifier 120 to microphone 110 bypassing the echo canceller 150. Typical training time is less than one second. Alternatively, the controller 200 does not force the training of the echo canceller 150 when the speakerphone is first enabled. Simply put and in one embodiment of the invention, each time the speakerphone enters a "receive" mode (when sound from a far-end party is reproduced by the speaker), the controller 200 closes switch 116 and the echo canceller adapts to the speakerphone's environment. Consequently, each time the speakerphone enters a "transmit" mode (when the speakerphone is configured to transmit sound from the microphone to the far-end party over the telephone line), the adaption of the echo canceller 150 is suspended.

It is understood that the switches 116 and 118 are symbolic in that the closing and opening of the switch 116 controls the enablement and disablement, respectively, of adaptation by the filter 114. Similarly, the switch 118 might be a multiplexer or simply the direction in software of digital data from digitized signals from the microphone 110 or from the summer 112 to a software version of the amplifier 120. It is understood that aside from the speaker, microphone, and hybrid (or other interface to the telephone line 106), the functional blocks described here can be implemented in software in a general purpose or a digital signal processor, or implemented in specialized hardware using dedicated circuitry such as an application-specific integrated circuit (ASIC) or a field-programmable gate array (FPGA).

In an alternative embodiment, the switch 118 does not exist and the input of the amplifier 120 is fixedly coupled either to the output of the echo canceller 150 or the microphone 110. In another embodiment, instead of the switch 118 bypassing the echo canceller 150, the switch is configurable to couple the input the amplifier 120 either to the canceller 150 or to a secondary echo canceller (not shown), coupled to the microphone 110 and node 128, which continuously adapts to reduce the presence of the speaker signal on node 128 in the signal from the microphone 110.

The adaptive filter 114 is conventional and operates generally as follows. The filter 114 receives the output signal from the summer 112 when the switch 116 is closed as described above. The filter 114 includes a controller (not shown but may be implemented by controller 200) that adjusts the filter's coefficient values to minimize or reduce below a threshold value the mean-square of the signal from the summer 112 using the well-known least-mean-square algorithm or the like, thereby training the filter 114 to remove audio signals emanating from speaker 124 from the signal from microphone 110. In effect and once the filter 114 is trained and switch 116 is opened, the echo canceller 150 has adapted the speakerphone 110 to the acoustic environment the speakerphone is located. Opening of switch 116 disables adaptation by the filter 114. Because the environment in which the speakerphone is placed changes during a call or a different far-end party begins to speak, the filter 114 in canceller 150 may need to be retrained during the call. In this embodiment, when the speakerphone is in the receive mode, retraining occurs, and in the transmit mode, training is suspended. In this embodiment and as will be described in more detail below, the rate of change in the level of the echo-canceled microphone signal on node 132 is compared to the rate of change in the level of the speaker signal on node 128 to determine if the speakerphone is to be operated in either the transmit (no training) mode or the receive (training) mode.

As discussed above, controller 200 controls operation of the echo canceller 150 and the gain of amplifiers 120, 122. An exemplary controller 200 in accordance with one embodiment of the invention is shown in FIG. 2. The controller 200 has two signal inputs, MI and SI. The MI input receives the echo-canceled microphone signal from node 132 (FIG. 1) and the SI input receives the speaker signal from node 128 (FIG. 1), referred to herein as the MI and SI signals, respectively. Using the echo-canceled signal instead of the microphone signal without echo-cancellation allows for a more reliable control over operation of the speakerphone. The level of the MI and SI signals are determined by root-mean-square (RMS) functions 202 and 252, respectively. It is understood that the RMS function might be replaced with an absolute value peak detector function or with a squaring function, the latter producing a signal proportional to the power of the respective input signal. For purposes here, the output of the functions 202 and 252 (whether RMS, square, peak, or some other function) are referred to herein as |SI| and |MI|, the levels of the input signals SI (the echo-canceled microphone signal or transmit signal) and MI (the speaker or received signal), respectively.

The log (natural or using another convenient base) of the levels of the SI signal (|SI|) and the MI signal (|MI|) are taken in by the log function 204 and 254, respectively. Because of the logarithmic functions, outputs of subtractors 206 and 256 generate on respective nodes 208, 258 the logarithm of the ratios of the MI and SI signal levels, log(|MI|/|SI|) and log (|SI|/|MI|), respectively. Multipliers 210, 260 scale the logarithmic values on nodes 208, 258 by weights $k_1$ and $k_2$, respectively to produce respective signals g_m(t) and g_s(t). These signals represent the ratio of the level of the echo-canceled microphone signal to the level of the speaker signal (g_m(t)) and the ratio of the level of the speaker signal to the echo-canceled microphone signal (g_s(t)). These signals can also be used to adjust the rate the respective functions 202, 252 are performed. For example, if the level of the echo-canceled microphone signal on input MI is very low compared to the level of the speaker signal in input SI, then the RMS function 202 does not have to be updated as rapidly as that of the function 252. Conversely, if the level of the speaker signal in input SI is very low compared to the level of the echo-canceled microphone signal on input MI, then the RMS function 202 does not have to be updated as rapidly as that of the function 252. Because of the ratio function resulting from the logarithm functions 204, 254 and the adders 206, 256, g_m(t) and g_s(t) vary inversely to each other. By way of example, if g_m(t) is significantly larger then g_s(t), the RMS function 202 is updated every millisecond and the RMS function 252 is updated every ten milliseconds. However, if g_s(t) is significantly larger than g_m(t), then the function 202 is updated every ten milliseconds and the RMS functions 252 every millisecond. When the two signals g_m(t) and g_s(t) are approximately the same value, then the update rate for both functions 202, 252 is approximately the same, e.g., ten milliseconds. The slower updating rate might save significant power during operation of the speakerphone 100. As will be explained in more detail below, the inverse variability of g_m(t) and g_s(t) are advantageously used to inversely control the gains of the amplifiers 120, 122 (FIG. 1).

The respective gains of the amplifiers 120, 122 are set by signals Tgain and Rgain. These signals are generated by integrating a product of the signals g_m(t) and g_s(t) and the levels of corresponding input signals MI and SI (|MI| and |SI|, respectively) offset by respective transmit threshold and receive threshold values. The threshold values, applied to the inverting input of adders 220, 270 are used to set a minimum signal level that the input signal levels MI, SI must exceed before the gain control signals Tgain and Rgain change. Multipliers 222, 272 generate the product of the offset signal levels and the signals g_m(t) and g_s(t) and those products are accumulated by integrators 224, 274. As will be discussed in connection with FIG. 4, the product values from multipliers 222, 272 represent the change (derivative or slope) to be made to the gain values Tgain, Rgain as the levels of the echo-canceled microphone signal and the speaker signal applied to inputs MI and SI, respectively, change during operation of the speakerphone.

As discussed above, the whether the speakerphone 100 is in the transmit mode or the receive mode depends on the relative change in levels of the transmit signal (the echo-canceled microphone signal on node 132 of FIG. 1) and receive signal (the speaker signal on node 128 of FIG. 1). Determining which mode the speakerphone 100 is to be placed in depends on how quickly or the rate the level of the echo-canceled microphone signal on input MI changes in comparison to how quickly or the rate the level of the speaker signal on input SI changes. In this embodiment, the rate of change (e.g., slopes or gradients) of the levels of the |MI| and |SI| signals are determined by differentiators 230 and 232, respectively, and the rate of change values compared to each other by comparator 282. If d(|SI|)/dt is greater than d(|MI|)/dt, then the speakerphone 100 is configured into the receive mode and training of the adaptive filter 114 in the echo canceller 150 is enabled. If d(|MI|)/dt is greater than d(|SI|)/dt, then the speakerphone 100 is configured into the transmit mode and training of the adaptive filter 114 in the echo canceller 150 is suspended. Alternative methods may be used to determine which mode the speakerphone 100 is to be operated. For example, in an alternative embodiment, because g_m(t) and g_s(t) are based on the ratio of the |MI| and |SI| signals, either the g_m(t) or g_s(t) signal is differentiated and the polarity of the slope or change in the signal is used to determine the mode. Moreover, hysteresis might be added to the comparator 282 to prevent rapid switching between modes when the outputs of the differentiators 230, 280 are close in value.

It is generally desirable that the gains of the amplifiers 120, 122 have a limited range and not changed abruptly, e.g. Tgain and Rgain should take several tens of milliseconds to change from one gain limit extreme to the other. Exemplary gains Tgain (for the transmit path 102) and Rgain (for the receive path 104) produced by controller 200 are based on the relative levels of the echo-canceled microphone and speaker signals as shown in FIG. 3. While the minimum and maximum gains for both the transmit path 102 and receive path 104 are shown as the same, it is understood that they might be different as required. As shown, the transmit path gain Tgain inversely varies compared to the receive path gain Rgain, with the gains of both paths being approximately equal to each other when the echo-canceled microphone signal level is approximately equal to the speaker signal level. As the echo-canceled microphone signal level increases beyond the speaker signal level (i.e., microphone predominant), the receive path gain decreases and the transmit path increases. Conversely, as the speaker signal level increases beyond the echo-canceled microphone signal level (i.e., speaker predominant), the transmit signal path gain decreases and the receive signal path gain increases. It is understood that other exemplary gain curves might be used.

FIG. 4 illustrates an exemplary process 400 executed by controller 200 to control the gain (Tgain) of transmit path 102 and the gain (Rgain) of the receive path 104 in the speakerphone 100. In one embodiment, when a speakerphone call is initiated (either from or to the speakerphone), in step 402 the transmit path gain set to the highest level (Tgain=maximum gain) and the receive path gain is set to the lowest level (Rgain=minimum level). This allows for the far-end party to hear any sounds in the vicinity of the speakerphone. Alternatively, the transmit and receive path gains may be set initially to have about the same amount of gain.

While the adaptive filter 114 in echo canceller 150 might be configured to adapt at initialization in step 402, in this embodiment no adaption occurs and the coefficients in the filter 114 are set to initial values or previously used values. Lastly, the speakerphone is configured for the transmit mode, inhibiting adaptation by the echo canceller 150.

Next, in step 404, the level of the echo-canceled microphone signal on node 132 is compared to the level of the speaker signal on node 128, by, for example, functions 202-

Figure 2:
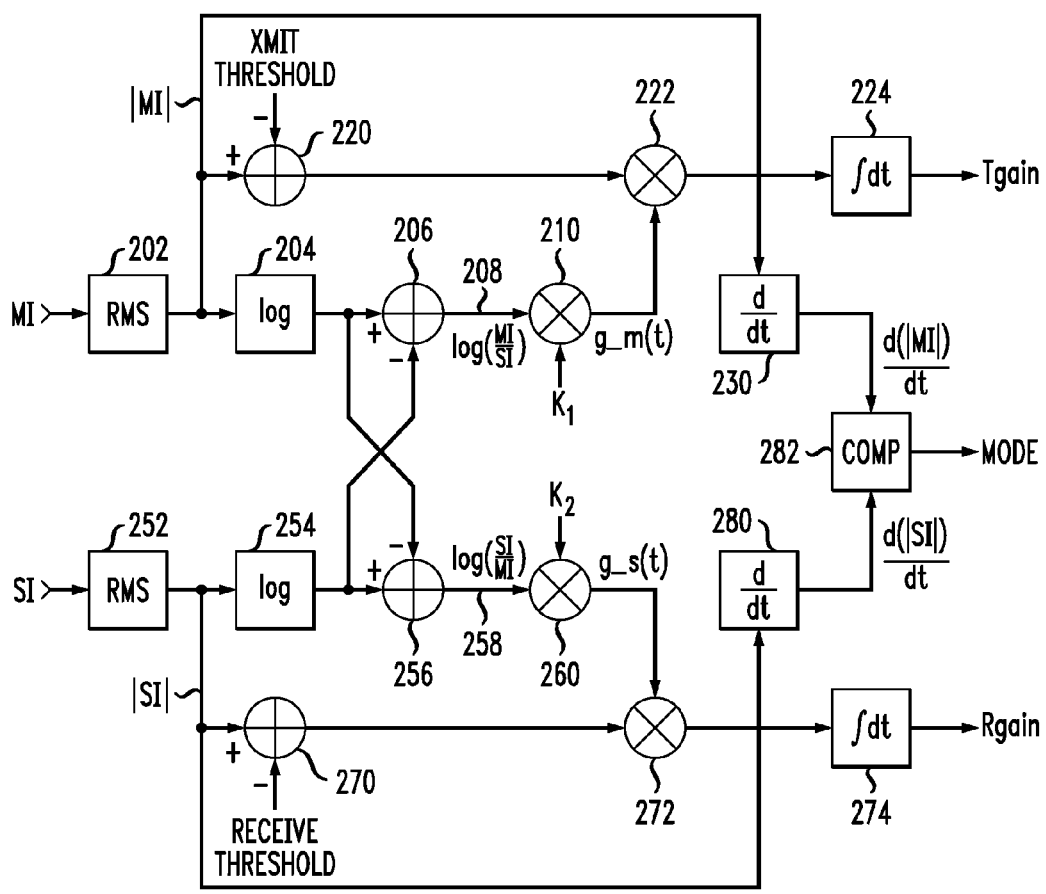
FIG. 2 is a simplified functional block diagram of an implementation of control block shown in FIG. 1 according to one embodiment of the invention.
Figure 3:
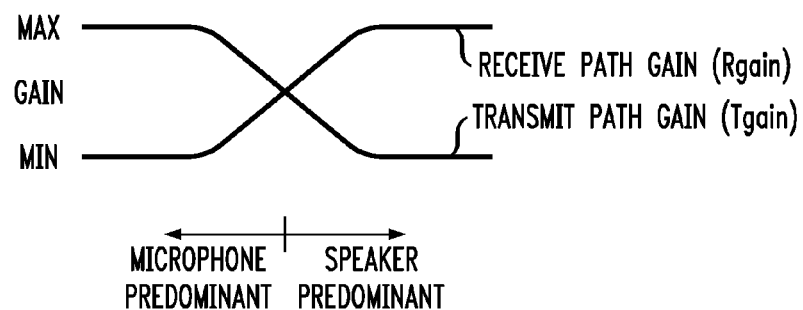
FIG. 3 is a plot of exemplary transmit path and receive path gain during operation of the speakerphone of FIG. 1.

206, 210, 252-256, and 260 in FIG. 2. Next, in step 406, if the echo-canceled microphone level, |MI|, is found to be greater than the speaker level, |SI|, then in step 408 the transmit path gain is stepped up by an amount approximately equal to the product of g_m(t) and |MI|, as discussed above. In addition, in step 408, the receive path gain is stepped down by an amount approximately equal to the product of g_s(t) and |SI|, as discussed above. If, however, in step 410, the speaker signal level, |SI|, is greater than the echo-canceled microphone signal level, |MI|, then in step 412 the transmit path gain is stepped down by an amount approximately equal to the product of g_m(t) and |MI|, and the receive path gain is stepped up by an amount approximately equal to the product of g_s(t) and |SI|. After steps 408 and 412, the above steps are repeated beginning with step 404.

Control path 414 is followed if the difference between the echo-canceled microphone level and the speaker level is smaller than a threshold amount (not shown). This is typically referred to as a hysteresis. When the difference between the two levels are close, hysteresis prevents the controller from repeatedly changing or dithering the gain values (and switching of the speakerphone between transmit and receive mode) from one value to another value and back again.

By the controller 200 comparing the speaker signal level to the level of the microphone signal after the acoustically-coupled signals from the speaker and concomitant echoes are removed by the echo canceller, the half-duplex speakerphone operates reliably in a "live" room with significant echoes. Further, because the transmit and receive path gains are adjusted on the relative level of the echo-canceled transmit signal to the receive signal so that the speakerphone works reliably (e.g., it does not get "stuck" in the transmit mode regardless of how loud the far-end party is) in a noisy environment or when the transmit gain is very high. Further, the echo canceller adapts when the change in level of the receive signal exceeds the change in the level of the echo-canceled transmit signal to assure that the echo-canceller adapts when sufficient received audio is present for an accurate adaptation.

While the exemplary embodiments of the present invention have been described with respect to processing blocks in a software program, including possible implementation as a digital signal processor, micro-controller, or general-purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bit stream or other sequence of signal values electrically or optically transmitted through a medium, stored magnetic-field variations in a magnetic recording medium, etc., generated using a method and/or an apparatus of the present invention.

It is understood that various changes in the details, materials, and arrangements of the parts which have been described and illustrated in order to explain the nature of this invention may be made by those skilled in the art without departing from the scope of the invention as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A speakerphone comprising:
   a transmit path having variable gain;
   a receive path having variable gain;
   a first level detector coupled to the transmit path for generating a level of the signals in the transmit path;
   a second level detector coupled to the receive path for generating a level of the signals in the receive path;
   a first differentiator coupled to the first level detector for determining a rate of change in the level of the signals in the transmit path;
   a second differentiator coupled to the second level detector for determining a rate of change in the level of the signals in the receive path;
   an adaptive echo canceler coupled to the transmit path for at least partially removing from the transmit path acoustically-coupled signals from the receive path; and
   a controller, responsive to the first and second level detectors and the first and second differentiators, is adapted to increase the gain of the transmit path and decrease the gain of the receive path when the level of the signals in the transmit path exceed the level of the signals in the receive path, and is adapted to decrease the gain of the transmit path and increase the gain of the receive path when the level of the signals in the receive path exceed the level of the signals in the transmit path;
   wherein the controller is further adapted to enable adaptation by the adaptive echo canceler when the rate of change in the level of the signals in the transmit path exceeds the rate of change in the level of the signals in the receive path by a hysteresis amount, and the controller is further adapted to disable adaptation by the adaptive echo canceler when the rate of change in the level of the signals in the transmit path exceeds the rate of change in the level of the signals in the receive path by the hysteresis amount.

2. The speakerphone of claim 1 wherein the transmit path comprises:
   a microphone; and
   a first amplifier having a gain determined by the controller and an input coupled to the microphone;
   and wherein the receive path comprises:
   a second amplifier having a gain determined by the controller; and
   a speaker coupled to an output of the second amplifier.

3. The speakerphone of claim 2 wherein the adaptive echo canceler comprises:

an adaptive filter having an input coupled to the output of the second amplifier; and a summer having a non-inverting input coupled to the microphone and an inverting input coupled to the output of the filter;

wherein the adaptive filter, when enabled by the controller, adapts to reduce signal levels at an output of the summer.

4. The speakerphone of claim 3 wherein the first level detector is responsive to the output of the summer, when the adaptive filter is not adapting the first amplifier amplifies signals directly from the microphone, and when the adaptive filter is adapting the first amplifier receives amplifies signals from the output of the summer.

5. The speakerphone of claim 4 wherein first and second level detectors perform a function selected from the group of root-mean-square, absolute peak detection, and squaring.

6. The speakerphone of claim 1 further comprising a hybrid for coupling the receive path and the transmit path to a communication network.

7. A speakerphone comprising:
a transmit path having variable gain;
a receive path having variable gain;
a first level detector coupled to the transmit path;
a second level detector coupled to the receive path;
a first logarithmic generator coupled to an output of the first level detector;
a second logarithmic generator coupled to an output of the second level detector;
first summer having a non-inverting input coupled to an output of the first logarithmic generator and an inverting input coupled to an output of the second logarithmic generator;
second summer having a non-inverting input coupled to the output of the second logarithmic generator and an inverting input coupled to the output of the first logarithmic generator;
a first multiplier having one input coupled to the output of the first level detector and a second input coupled to an output of the first summer;
a second multiplier having one input coupled to the output of the second level detector and a second input coupled to an output of the second summer;
first integrator having an input coupled to an output of the first multiplier;
second integrator having an input coupled to an output of the second multiplier;
a first differentiator coupled to the output of the first level detector for determining a rate of change in the level of the signals in the transmit path;
a second differentiator coupled to the output of the second level detector for determining a rate of change in the level of the signals in the receive path;
an adaptive echo canceler coupled to the transmit path for at least partially removing from the transmit path acoustically-coupled signals from the receive path; and
a controller, responsive to the first and second differentiators, is adapted to enable adaptation by the adaptive echo canceler when the rate of change in the level of the signals in the transmit path exceeds the rate of change in the level of the signals in the receive path by a hysteresis amount, and the controller is further adapted to disable adaptation by the adaptive echo canceler when the rate of change in the level of the signals in the transmit path exceeds the rate of change in the level of the signals in the receive path by the hysteresis amount;

wherein the gain of the transmit path is substantially determined by an output of the first integrator and the gain of the receive path is substantially determined by the output of the second integrator.

8. The speakerphone of claim 7 wherein each of the first and second level detectors each have an update rate proportional to the level of the signals applied to the respective detector.

9. The speakerphone of claim 7 further comprising:
a first summer disposed between the first level detector and the first multiplier and having an inverting input adapted to receive a first threshold level, and
a second adder disposed between the second level detector and the second multiplier and having an inverting input adapted to receive a second threshold level;
wherein the first and second threshold levels are levels above which the level of the signals in the transmit path and the level of the signals in the receive path, respectively, must exceed before the respective transmit path gain and receive path gain are changed.

10. A method of operating a speakerphone having a variable gain transmit path and a variable gain receive path, comprising the steps of:
producing echo-canceled transmit signals using an adaptive echo canceler;
determining a level of the received signals;
determining a level of the echo-canceled transmit signals;
determining a rate of change in the level of the received signals;
determining a rate of change in the level of the echo-canceled transmit signals;
comparing the level of the echo-canceled transmit signals to the level of the received signals;
calculating a first amount based on a product of the level of the echo-canceled transmit signals and a ratio of the level of the echo-canceled transmit signals to the level of the received signals;
calculating a second amount based on a product of the level of the received signals and a ratio of the level of the received signals to the level of the echo-canceled transmit signals;
increasing the transmit gain path by the first amount and decreasing the gain of the receive path by the second amount if the level of the echo-canceled transmit signals is greater than the level of the received signals;
decreasing the transmit gain path by the first amount and increasing the gain of the receive path by the second amount if the level of the received signals is greater than the level of the echo-canceled transmit signals;
repeating the above steps at least until the level of the echo-canceled transmit signals is approximately the same as the level of the received signals;
enabling adaptation by the adaptive echo canceler when the rate of change of the level of the echo-canceled transmit signals exceeds the rate of change in the level of the received signals by a hysteresis amount; and
disabling adaptation by the adaptive echo canceler when the rate of change in the level of the echo-canceled transmit signals exceeds the rate of change in the level of the received signals by the hysteresis amount.

11. The method of claim 10 further comprising the steps of:
differentiating the level of the echo-canceled transmit signals;
differentiating the level of the received signals;
comparing the differentiated levels to each other;
enabling the echo canceler to adapt in response to the echo-canceled transmit signals if the differentiated echo-canceled transmit signals level is greater than the differentiated received signals level; and inhibiting the echo canceler from adapting if the differentiated received signals level is greater than the differentiated echo-canceled transmit signals level.

12. The method of claim 10 wherein the method is implemented by a machine executing program code encoded on a non-transitory machine-readable storage medium.

\* \* \* \* \*